United States Patent
Mau

(10) Patent No.: US 6,173,995 B1
(45) Date of Patent: Jan. 16, 2001

(54) SELF-FLARING, SPLIT BUSHING PIPE FITTING AND HOSE ASSEMBLIES EMPLOYING SAME

(75) Inventor: Andrew E. Mau, Enfield, CT (US)

(73) Assignee: Titeflex Corporation, Springfield, MA (US)

(*) Notice: Under 35 U.S.C. 154(b), the term of this patent shall be extended for 0 days.

(21) Appl. No.: 09/018,374

(22) Filed: Feb. 4, 1998

Related U.S. Application Data

(60) Provisional application No. 60/057,557, filed on Aug. 29, 1997.

(51) Int. Cl.[7] .................................................. F16L 9/14
(52) U.S. Cl. ..................... 285/55; 285/334.5; 285/354; 285/903; 285/422
(58) Field of Search ........................... 285/334.5, 354, 285/903, 55, 422, 332

(56) References Cited

U.S. PATENT DOCUMENTS

| | | | |
|---|---|---|---|
| 2,113,211 | * 4/1938 | Lake | 285/334.5 X |
| 2,172,532 | * 9/1939 | Fentress | 285/354 X |
| 2,323,912 | * 7/1943 | Johnson | 285/334.5 |
| 2,687,904 | * 8/1954 | Tornblom | 285/354 X |
| 3,008,738 | * 11/1961 | Longfellow | 285/332 |
| 3,907,335 | 9/1975 | Burge et al. | 285/23 |
| 4,059,297 | 11/1977 | Grahl et al. | 285/340 |
| 4,124,235 | 11/1978 | Grahl et al. | 285/340 |
| 4,630,850 | * 12/1986 | Saka | 285/903 X |
| 4,674,775 | * 6/1987 | Tajima | 285/903 X |
| 5,024,468 | 6/1991 | Burge | 285/39 |
| 5,354,108 | 10/1994 | Sandor | 285/414 |
| 5,553,893 | * 9/1996 | Foti | 285/903 X |
| 5,622,394 | 4/1997 | Soles et al. | 285/256 |
| 5,799,989 | * 9/1998 | Albino | 285/903 X |
| 5,845,946 | * 12/1998 | Thomas | 285/903 X |

FOREIGN PATENT DOCUMENTS

| | | | |
|---|---|---|---|
| 0 381 981 A1 | 8/1990 | (EP) . | |
| 381981 | * 8/1990 | (EP) | 285/903 |
| 547776 | * 12 1922 | (FR) | 285/334.5 |
| 2241547 | * 9/1991 | (GB) | 295/903 |

OTHER PUBLICATIONS

OmegaFlex, Inc., Catalog TP1197, TRACPIPE Runs Circles Around Black Iron Pipe, (1997).
Ward Manufacturing, Rev. IV Jul. 1995, WARDFLEX A Gas Piping System for Today . . . and the 21st Century, (1995).

* cited by examiner

*Primary Examiner*—Dave W. Arola
(74) *Attorney, Agent, or Firm*—Mary R. Bonzagni, Esq.; Holland & Bonzagni, P.C.

(57) ABSTRACT

A self-flaring fitting assembly for semi-flexible, convoluted tubes or pipes is provided. The inventive fitting assembly, which basically comprises an adaptor, a nut, and a split bushing assembly, eliminates the need for sealing gaskets, is reusable, and further facilitates the ease and speed of installation of semi-flexible piping systems. When used with jacketed tubing, the present inventive fitting assembly is capable of both preventing the undesirable movement of the jacket during installation and assembly and of reducing or eliminating exposure of the tubing located within the fitting assembly to contaminants or corrosive materials found in the surrounding environment.

26 Claims, 5 Drawing Sheets

SELF-FLARING, SPLIT BUSHING PIPE FITTING AND HOSE ASSEMBLIES EMPLOYING SAME

RELATED APPLICATION

This application is based in part on Provisional Patent Application Ser. No. 60/057,557, filed Aug. 29, 1997.

FIELD OF THE INVENTION

This invention relates to fittings for semi-flexible pipes or tubing and, more particularly relates to a self-flaring and self-aligning fitting or fitting assembly that is suitable for use with convoluted metal or plastic tubing. This invention further relates to hose assemblies that employ such fittings.

BACKGROUND OF THE INVENTION

In 1983, a research and development effort relating to interior fuel gas piping systems was undertaken by the Gas Research Institute (GRI). The objective of this research and development effort was to identify and develop novel piping systems and materials that could serve as viable alternatives to conventional rigid black iron piping systems.

As a result of this effort, a piping system was developed that used semi-flexible, convoluted stainless steel tubing (CSST) in combination with elevated gas pressures of up to about 0.03 megapascals (MPa). This piping system offered marked advantages over rigid black iron piping systems. Included among these advantages were ease and speed of installation, elimination of the need for precise and time-consuming onsite measuring, cutting and threading of piping sections, and reduction of the need for certain fittings such as elbows, tees and couplings. One disadvantage that has been identified is increased flow resistance imposed by the tubing convolutions and by smaller internal diameters. This disadvantage has resulted in a requirement for higher system pressures and additional gas pressure regulators upstream of equipment requiring lower gas supply pressures.

Fittings that are conventionally used with CSST fuel gas piping, systems require the use of fiber sealing gaskets or the pre-flaring of the ends of the tubing. Fittings that require the use of fiber sealing gaskets are not completely reusable due to the fact that the gasket, which is mechanically compressed between (and possibly adhered to) the tubing and other fitting components, must be replaced. More importantly, the use of such fiber sealing gaskets is problematic in that such gaskets undergo gradual deterioration over time which compromises the integrity of the gas tight seal effected by such fittings.

One such prior art fitting is a fitting manufactured and sold by Ward Manufacturing, Blossburg, Pa., under the trade designation WARDFLEX™. The WARDFLEX™ fitting, which is later described in detail, obviates the need for pre-flaring the ends of the tubing and is self-aligning to the extent that it aligns the tubing within the bore of an adaptor. However, the WARDFLEX™ fitting relies upon a fiber gasket to effect a gas tight seal and is not completely reusable. Moreover, this fitting does not serve to prevent the undesirable movement of the tubing jacket during installation and assembly nor does it serve to reduce or eliminate exposure of the tubing located within the fitting to contaminants or corrosive materials found in the surrounding environment.

One improvement over this prior art fitting is a fitting manufactured and sold by Mestek, Inc., Westfield, Mass., under the trade designation AUTOFLARE™. The AUTOFLARE™ fitting is self-flaring and comprises: an adaptor, a steel collar inserted in the adaptor for alignment purposes, a nut and a brass split ring. Although the AUTOFLARE™ fitting does not employ a fiber sealing gasket it requires the use of a relatively small and hard to manipulate split ring that adversely impacts upon the ease of assembly. Moreover, this fitting also does not serve to prevent the undesirable movement of the tubing jacket during installation and assembly. In addition, it does not serve to reduce or eliminate exposure of the tubing located within the fitting to contaminants or corrosive materials found in the surrounding environment.

It is therefore an object of the present invention to provide a reusable fitting assembly that further facilitates the ease and speed of installation of semi-flexible piping systems.

It is a more particular object to provide a self-aligning and self-flaring fitting assembly that eliminates the need for sealing gaskets and that, when used with jacketed tubing, is capable of both preventing the undesirable movement of the jacket during installation and assembly and of reducing or eliminating exposure of the tubing located within the fitting assembly to contaminants or corrosive materials found in the surrounding environment.

It is a further object of the present invention to provide a hose assembly that employs such a fitting assembly.

SUMMARY OF THE INVENTION

In accordance with these objects, the present invention provides:

a self-aligning and self-flaring fitting assembly for semi-flexible, convoluted pipes, which comprises:

an adaptor having a pipe receiving bore, which comprises: a first section having a diameter; a second section having a reduced diameter; and an internal stop shoulder intermediate thereto which prevents the pipe from passing completely through the adaptor;

a nut having a pipe receiving bore and a stop shoulder;

adjustable interengaging means on the nut and on the first section of the adaptor for moving the nut in threaded engagement towards the adaptor; and a spilt bushing assembly having a bore and comprising: at least two alignable and substantially arcuate bushing sections that, when assembled together, define an opening; at least two spaced internal ribs that serve to lock the bushing sections in place on an end of a convoluted pipe; a first end which is engageable with the internal stop shoulder of the adaptor; and a second end which is engageable with the stop shoulder of the nut;

wherein, when the bushing sections of the split bushing assembly are assembled on an end of a convoluted tube or pipe that has been inserted through the nut, such that the internal ribs of the split bushing assembly engage circumferential grooves on the convoluted pipe, and when the convoluted pipe end with the bushing sections assembled thereon is inserted into the first section of the adaptor and the nut moved in threaded engagement towards the adaptor, a first convolution on the end of the convoluted pipe is compressed between the internal stop shoulder of the adaptor and the first end of the split bushing assembly in a flared configuration while each internal rib of the split bushing assembly sealably contacts a circumferential groove on the convoluted pipe.

The present invention also provides a hose assembly that employs the inventive fitting assembly.

The foregoing and other features and advantages of the present invention will become more apparent from the following description and accompanying drawings.

DESCRIPTION OF THE PREFERRED EMBODIMENT

The present inventive pipe fitting assembly will be described hereinbelow mainly in association with interior fuel gas piping systems. However, the invention is not so limited. The inventive pipe fitting assembly can also be used for any convoluted hose application including, but not limited to, those applications dedicated to the transfer of chemicals, liquid petroleum, water and steam.

Moreover, although the inventive fitting assembly is described hereinbelow mainly in conjunction with convoluted stainless steel tubing or CSST, any type of semi-flexible tubing that can accommodate a wide variety of corrosive or aggressive fluids is envisioned, including, but not limited to, semi-flexible tubing made from thermoplastic, metal or metal alloy materials such as olefin-based plastics (e.g., polyethylene (PE)), fluorocarbon polymers (e.g., polytetrafluoroethylene (PTFE)), carbon steel, copper, brass, aluminum, titanium and nickel alloys.

Figure 1:
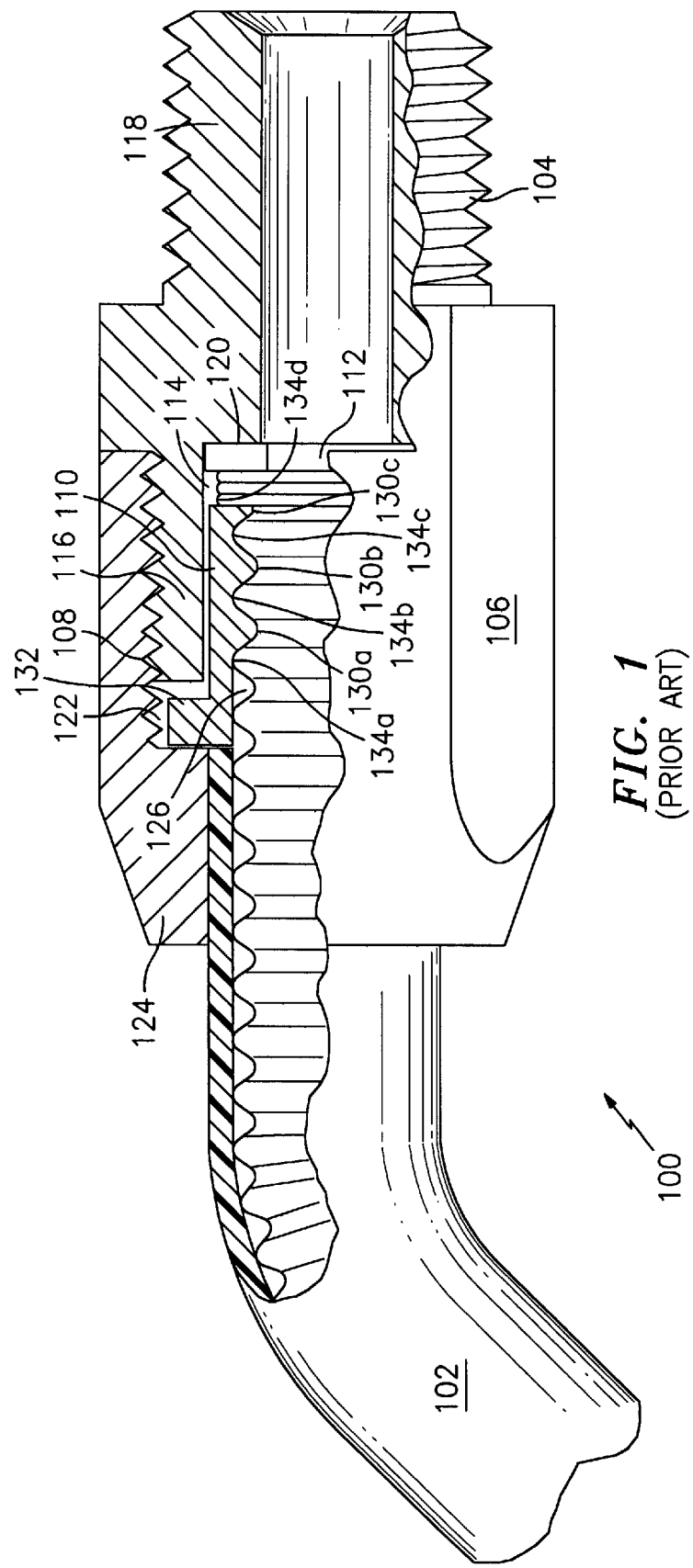
FIG. 1 is a cross-sectional view of a prior art convoluted pipe fitting manufactured and sold Ward by Manufacturing, Blossburg, Pa., under the trade designation WARDFLEX™.

Specific reference is now made to FIG. 1, which depicts a prior art fitting, marketed under the trade designation WARDFLEX™, which is shown generally at 100. The WARDFLEX™ fitting 100 is used in conjunction with jacketed, convoluted tubing 102 and is basically comprised of: an adaptor 104; a nut 106; adjustable interengaging means 108 on the nut 106 and on the adaptor 104; a split retainer 110; and a fiber sealing gasket 112. The adaptor 104 has a pipe receiving bore 114 and a first section 116 and a second "reduced diameter" section 118 separated by a perpendicular stop shoulder 120. The nut 106 has a pipe receiving bore 122 and a "reduced diameter" first end 124, while the split retainer 110 has a bore 126, two opposing arcuate sections 128a, b (not shown); three contiguous internal ribs 130a, b, c; and a first end 132 that is engageable with the "reduced diameter" first end 124 of the nut 106.

When assembling the WARDFLEX™ fitting 100 on the jacketed tubing 102, the jacket is first cut back from the end so as to expose at least seven convolutions on tubing 102. The exposed end is then fed through the nut 106 and the split retainer 110 positioned thereon three convolutions back from the end. In particular, the internal ribs 130a, b, c of split retainer 110 each fit against and conform to circumferential grooves located between convolutions 134a, b, c, d of the jacketed tubing 102. The fiber sealing gasket 112 is then fixed in position against the stop shoulder 120 of adaptor 104 and the nut 106 moved in threaded engagement toward the adaptor 104. As the nut 106 moves toward the adaptor 104, the three convolutions located between the split retainer 110 and the gasket 112 become compressed and thereby assumably form a gas tight seal. In the resulting fitting assembly, the jacket is not secured or locked in place by fitting 100 and the split retainer 110 is mechanically compressed only against the exposed end of tubing 102.

As will be readily evident to those skilled in the art, non-metal, fiber gaskets must be handled carefully in order to avoid contamination and to prevent cutting or scoring the gaskets during assembly or damage resulting thereto from overtightening the fitting assembly. Moreover, fiber gaskets are adversely affected by weather, moisture and freeze/thaw cycles and therefore fitting assemblies that employ such fiber gaskets must be monitored to assure maintenance of gas tight seals.

Figure 2:
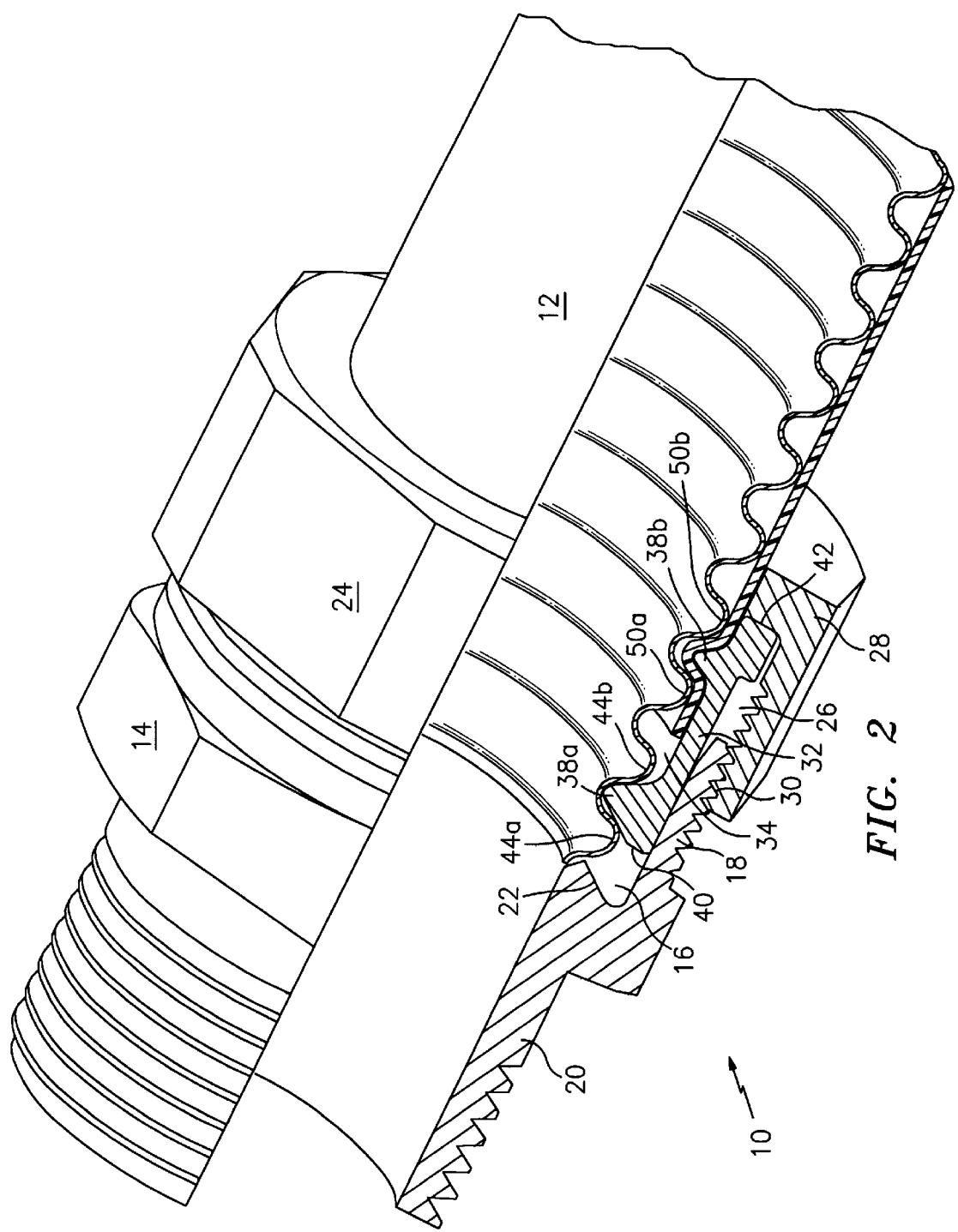
FIG. 2 is a cross-sectional view of a partially assembled fitting assembly constructed in accordance with a preferred embodiment of the present invention.

Referring now to FIG. 2, a partially assembled fitting assembly constructed in accordance with a preferred embodiment of the present invention is shown generally at 10. The inventive fitting assembly 10 is shown in conjunction with jacketed, convoluted tubing 12 and is basically comprised of: an adaptor 14 having a pipe receiving bore 16, which comprises: a first section 18 having a diameter a; a second section 20 having a reduced diameter b; and a radially inwardly extending interior stop shoulder 22; a nut 24 having a bore 26 and a stop shoulder 28; adjustable interengaging means 30 on the nut 24 and on the first section 18 of the adaptor 14 for moving the nut 24 in threaded engagement toward the adaptor 14; and a split bushing assembly 32 having a bore 34, which comprises: a pair of oppositely disposed, alignable, substantially arcuate and semi-circular bushing halves 36a, b (not shown) that when assembled together, define a circular opening; at least two spaced internal ribs 38a, b that serve to lock bushing halves 36a, b in place on an end of tubing 12; a first end 40 which is engageable with the radially inwardly extending internal stop shoulder 22 of the adaptor 14; and a second end 42 which is engageable with the stop shoulder 28 of the nut 24. As will be readily apparent to those skilled in the art, internal ribs 38a, b are adapted to engage circumferential grooves on convoluted tubing 12. Opposed bushing halves 36a, b engage the same grooves, which extend circumferentially around the tubing 12. In this manner, the bushing halves 36a, b are substantially locked in place over the end of tubing 12.

The second section 20 of adaptor 14 may adopt any configuration necessary to adapt it to the respective piping system. For example, second section 20 may adopt a step or normal "T", 45° or 90° configuration.

Figure 4:
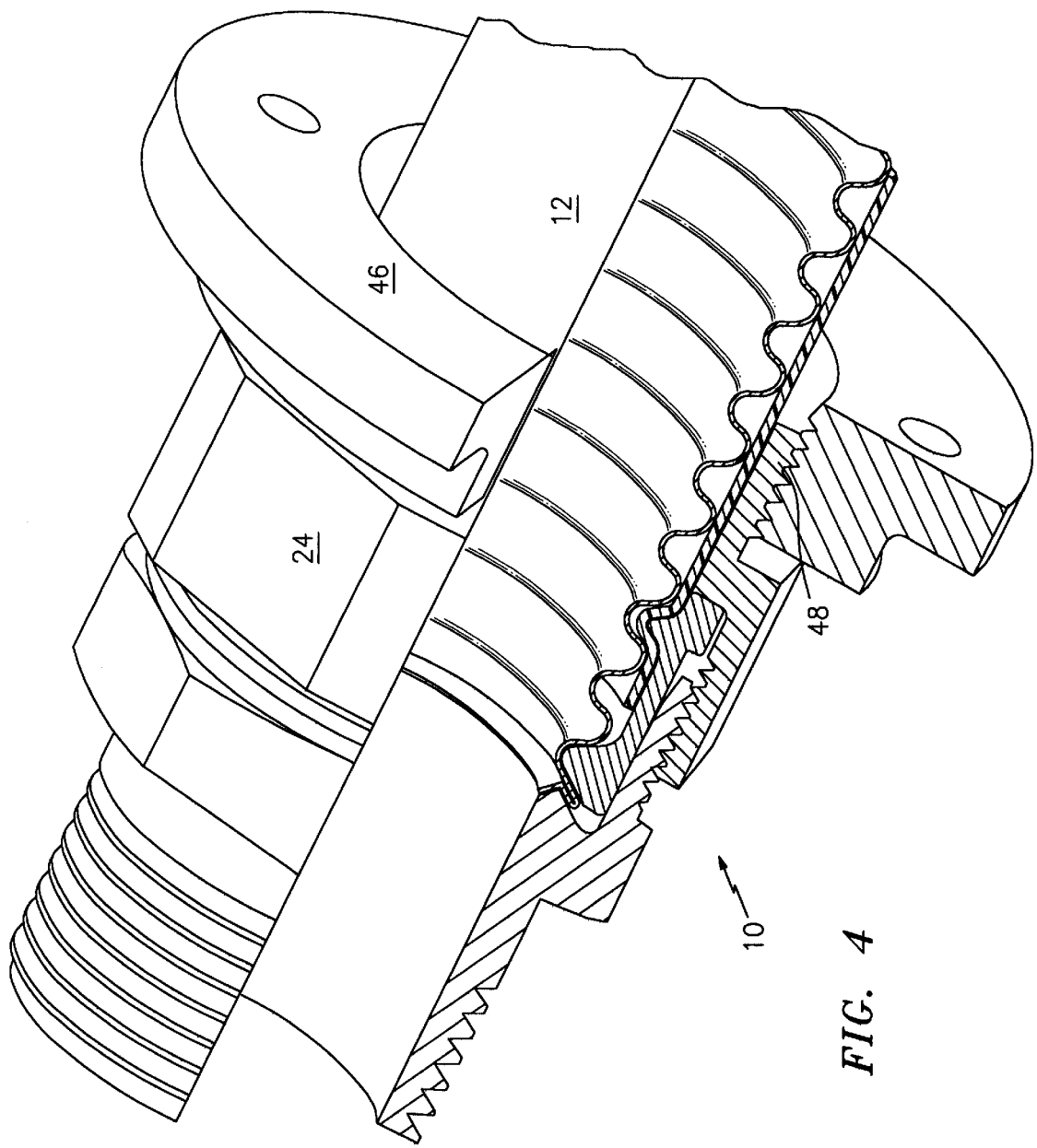
FIG. 4 is a cross-sectional view of another preferred embodiment of the present invention that employs a termination fitting.

Moreover, nut 24 may also be modified to adopt any necessary configuration. For example, and as best shown in FIG. 4, the nut 24 can be modified to accommodate a termination fitting 46. In particular, nut 24 may further comprise a first section 48 capable of threadably engaging termination fitting 46.

Contemplated materials for use in making adaptor 14, nut 24, and split bushing assembly 32 include thermoset resins such as phenolics, acrylics and epoxies, thermoplastic resins such as polyamides, styrenic polymers (e.g., ABS) and fluorocarbon polymers (e.g., PTFE), and metal and metal alloy materials such as carbon steel, copper, brass, aluminum, titanium, stainless steel and nickel alloy. In a preferred embodiment adaptor 14, nut 24 and bushing assembly 32 are made of a brass alloy. The above-referenced components, namely—adaptor 14, nut 24 and split bushing assembly 32 are available from Titeflex Corporation, 603 Hendee Street, Springfield, Mass. 01139-0054 under the product designation GASTITE® fitting assembly and having product part number XRFTG.

Figure 3:
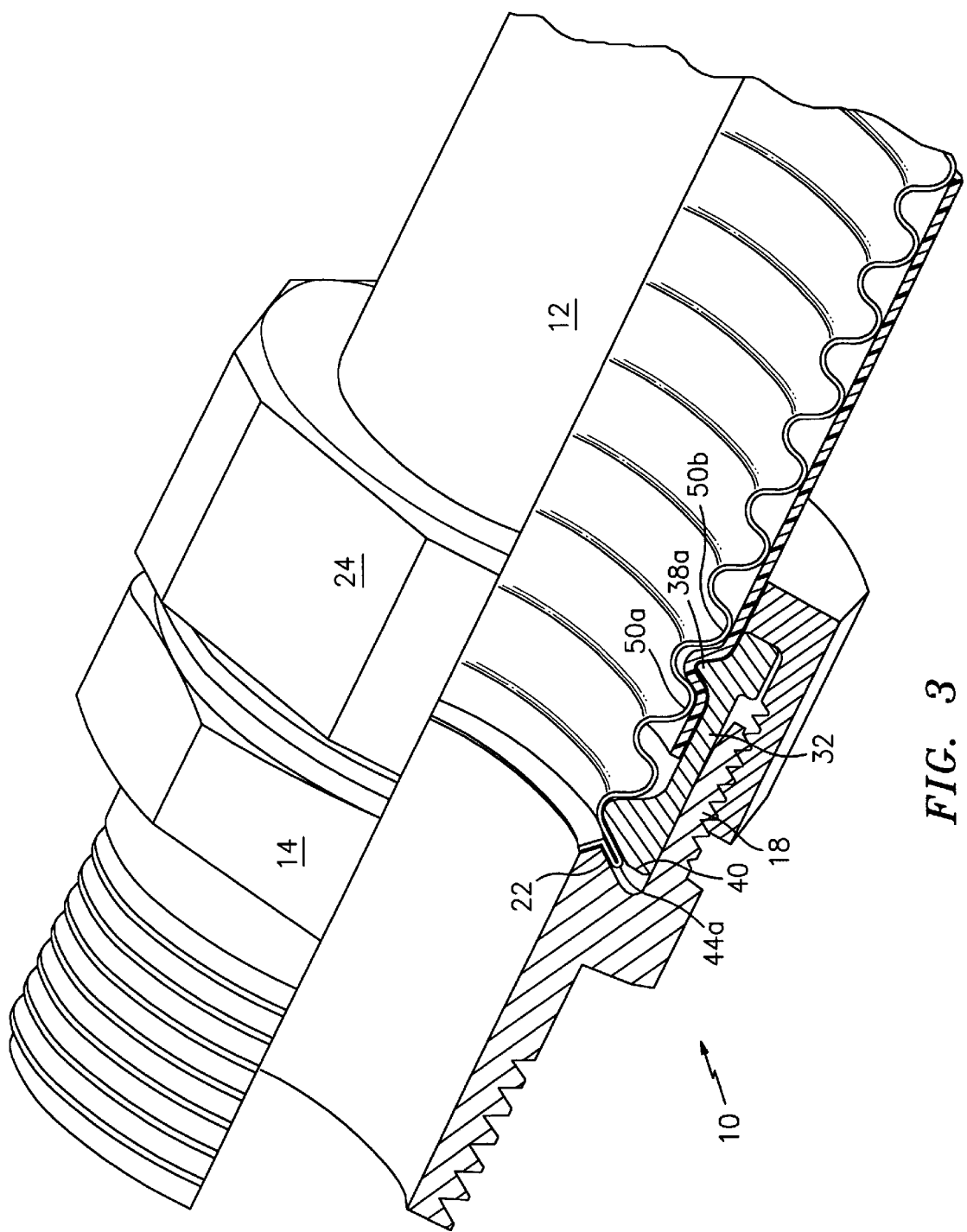
FIG 3 is a cross-sectional view of the fitting assembly of FIG. 2 that has been fully assembled.

When assembling the inventive fitting assembly 10 on the jacketed tubing 12, the tubing 12 is cut to a desired length allowing approximately 2.54 centimeters (cm) for the fitting assembly 10. The tubing 12 is preferably cut in a circumferential groove or recessed area on convoluted tubing 12. The jacket is then cut back or stripped from the end of the tubing 12 so as to expose two convolutions 44a, b thereon. The nut 24 is then slid over tubing 12 and the split bushing assembly 32 positioned on the end thereof such that rib 38a fits against and conforms to the recessed area located between convolutions 44a and 44b and rib 38b contacts the jacket on tubing 12 between convolutions 50a and 50b. As best shown in FIG. 3, the end of the tubing 12 having the split bushing assembly 32 positioned thereon is inserted into the first section 18 of adaptor 14. The nut 24 is then moved in threaded engagement toward the adaptor 14 causing rib 38a to lock the jacket on tubing 12 between convolutions 50a and 50b thereby effecting a contaminant resistant seal while also causing convolution 44a to become compressed between the internal stop shoulder 22 of the adaptor 14 and the first end 40 of the split bushing assembly 32 resulting in a gas tight seal while adopting a flared configuration. By cutting the tubing 12 in a circumferential groove or recessed area, any rough edges or areas remaining on the metal as a result of cutting do not interfere with or adversely affect the gas tight seal that results from the assembly of the present inventive fitting 10. In a more preferred embodiment, fitting assembly 10 employs at least one piloting or self-alignment means. Such piloting means include, but are not limited to, configuring the split bushing assembly 32 such that its outer diameter approximates diameter a of the first section 18 of adaptor 14, thereby ensuring that tubing 12 is aligned properly within adaptor 14 for a uniform flare and a gas tight seal. In addition to the benefits described hereinabove, the design of inventive fitting assembly 10 obviates the need for special tools to assemble the fitting. Two wrenches, a utility knife and a standard tube cutter are the only tools necessary to assemble the fitting 10 on convoluted tubing 12 and to effect safe, gas-tight connections. During the tightening process only the nut 24 is rotated which serves to facilitate installations in confined spaces. Moreover, fitting, 10 relies upon a superior metal-to-metal seal and not upon fiber gaskets and their drawbacks. In addition, when fitting 10 is used in conjunction with jacketed, convoluted tubing, the split bushing assembly 32 serves to avoid unintended movement of the jacket (i.e., jacket "pull-back") during installations in confined spaces and serves to reduce or eliminate exposure of the unjacketed end portion of the tubing 12 to contaminants found in the surrounding environment by sealing against the jacket on tubing 12.

Figure 5:
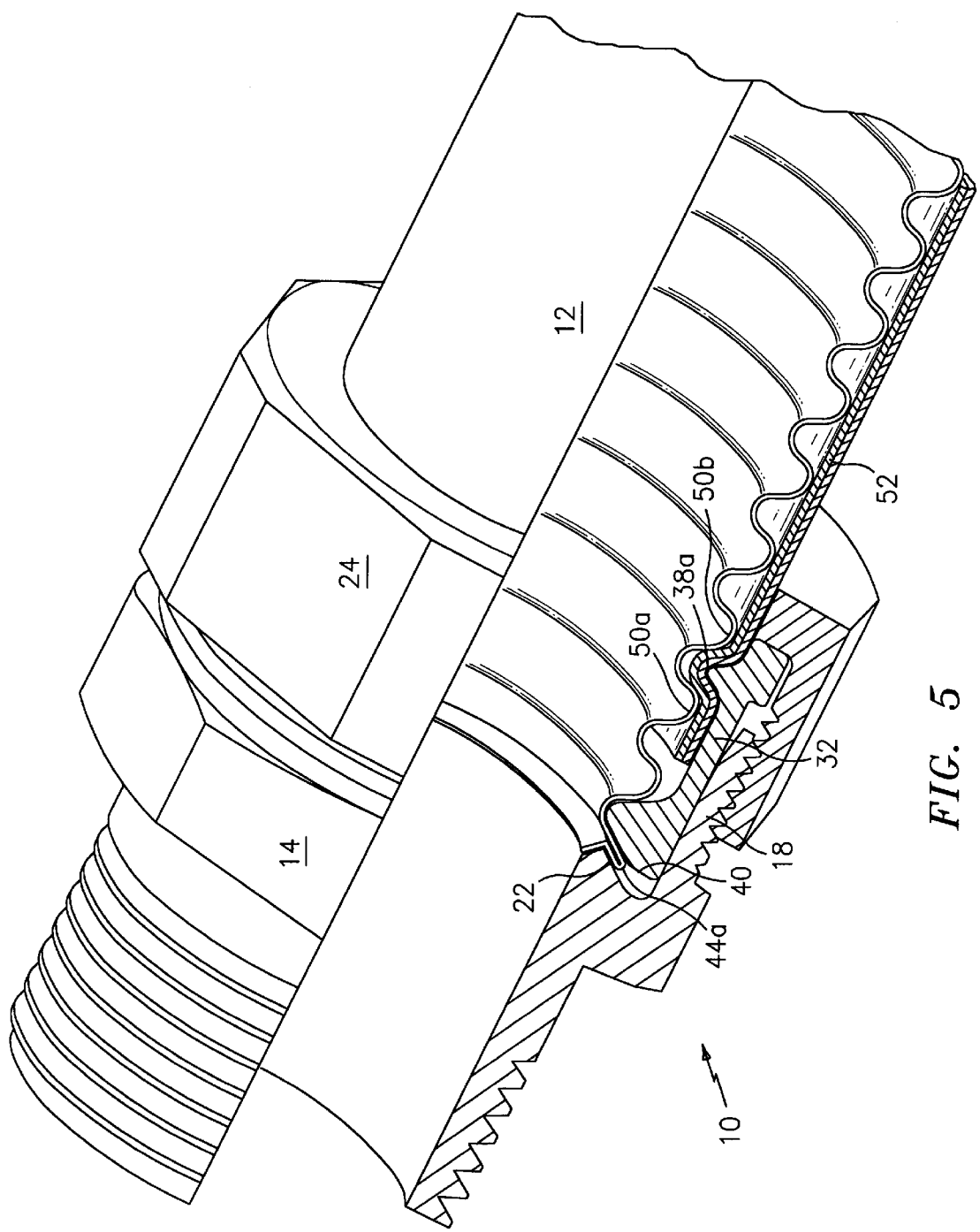
FIG. 5 is a cross-sectional view of a fully assembled fitting assembly positioned on a jacketed, reinforced convoluted tube in accordance with a preferred embodiment of the present invention.

It should be understood by those skilled in the art that obvious modifications can be made to the present inventive fitting assembly 10 without departing from the spirit of the invention. For example and as shown in FIG. 5, modifications to fitting assembly 10 that are necessitated by the use of convoluted tubing in conjunction with reinforcing layers 52, such as metal braid reinforcing layers, and optionally, protective jackets, such as polyvinyl chloride (PVC) or PE protective jackets, are considered to be within the scope of the present invention.

Having thus described the invention, what is claimed is:

1. A self-flaring fitting assembly for semi-flexible, convoluted pipes or tubing, which comprises:

an adaptor having a tube receiving bore, which comprises: a first section having a diameter; a second section having a reduced diameter; and an internal stop shoulder intermediate thereto which prevents said tube from passing completely through said adaptor, wherein said stop shoulder extends radially inwardly forming an acute angle with said first section of said adaptor;

a nut having a tube receiving bore and a stop shoulder;

adjustable interengaging means on said nut and on said first section of said adaptor for moving said nut in threaded engagement towards said adaptor; and a spilt bushing assembly having a bore and comprising: at least two alignable and substantially arcuate bushing sections that, when assembled together, define an opening: at least two spaced internal ribs; an acutely angled first end; and a second end which is engageable with said stop shoulder of said nut;

wherein, when said bushing sections of said split bushing assembly are assembled on an end of a convoluted tube that has been inserted through said nut, such that said internal ribs of said split bushing assembly contact circumferential grooves on said end of said convoluted tube, and when said end of said convoluted tube with said bushing sections assembled thereon is inserted into said first section of said adaptor and said nut moved in threaded engagement toward said adaptor, a first convolution of said end of said convoluted tube is compressed between said internal stop shoulder of said adaptor and said first end of said split bushing assembly in a flared configuration.

2. The self-flaring fitting assembly of claim 1, wherein said bushing sections of said split bushing assembly comprise a pair of oppositely disposed, alignable, substantially arcuate and semi-circular bushing halves that, when assembled together, define a circular opening, and wherein said internal ribs of said split bushing assembly comprise two spaced internal ribs.

3. The self-flaring fitting assembly of claim 1, which further comprises a self-alignment means.

4. The self-flaring fitting assembly of claim 1, wherein said fitting assembly further comprises a termination fitting and wherein said nut further comprises a first section capable of threadably engaging said termination fitting.

5. The self-flaring fitting assembly of claim 1, wherein said adaptor, said nut and said split bushing assembly are prepared using a thermoset resin material selected from the group consisting of phenols, acrylics, and epoxies.

6. The self-flaring fitting assembly of claim 1, wherein said adaptor, said nut and said split bushing assembly are prepared using a thermoplastic resin material selected from the group consisting of polyamides, styrenic polymers and fluorocarbon polymers.

7. The self-flaring fitting assembly of claim 1, wherein said adaptor, said nut and said split bushing assembly are prepared using a metal and/or metal alloy material selected from the group consisting of aluminum, brass alloy, carbon steel, copper, nickel alloy, stainless steel, titanium, and blends thereof.

8. The self-flaring fitting assembly of claim 7, wherein said adaptor, said nut and said split bushing assembly are prepared using a brass alloy.

9. The self-flaring fitting assembly of claim 1, wherein an inner surface of said second section of said adaptor has a first end which is contiguous to said stop shoulder, wherein said first end extends radially outwardly from said inner surface of said second section of said adaptor forming a reflex angle therewith.

10. A hose assembly, for conducting fluids therethrough, which comprises:
   a convoluted tube having outermost surfaces and a first end having a first convolution; and
   a self-flaring fitting assembly, which comprises:
      an adaptor having a tube receiving bore, which comprises: a first section having a diameter; a second section having a reduced diameter; and an internal stop shoulder intermediate thereto which prevents said tube from passing completely through said adaptor, wherein said stop shoulder extends radially inwardly forming an acute angle with said first section of said adaptor;
      a nut having a tube receiving bore and a stop shoulder;
      adjustable interengaging means on said nut and on said first section of said adaptor for moving said nut in threaded engagement towards said adaptor; and
      a split bushing assembly having a bore and comprising: at least two alignable and substantially arcuate bushing sections that, when assembled together, define an opening; at
      least two spaced internal ribs;
      an acutely angled first end;
      and a second end which is engageable with said stop shoulder of said nut;
      wherein, when said bushing sections of said split bushing assembly are assembled on said first end of said convoluted tube that has been inserted through said nut, such that said internal ribs of said split bushing assembly contact circumferential grooves on said first end of said convoluted tube, and when said first end of said convoluted tube with said bushing sections assembled thereon is inserted into said first section of said adaptor and said nut moved in threaded engagement toward said adaptor, said first convolution of said first end of said convoluted tube is compressed between said internal stop shoulder of said adaptor and said first end of said split bushing assembly in a flared configuration.

11. The hose assembly of claim 10, wherein said bushing sections of said split bushing assembly comprise a pair of oppositely disposed, alignable, substantially arcuate and semi-circular bushing halves that, when assembled together, define a circular opening, and wherein said internal ribs of said split bushing assembly comprise two spaced internal ribs.

12. The hose assembly of claim 10, wherein said convoluted tube is prepared using a thermoplastic resin, metal or metal alloy material.

13. The hose assembly of claim 12, wherein said convoluted tube is prepared using a thermoplastic resin material selected from the group consisting of olefin-based plastics and fluorocarbon polymers.

14. The hose assembly of claim 12, wherein said convoluted tube is prepared using a metal or metal alloy material selected from the group consisting of aluminum, brass alloy, carbon steel, copper, nickel alloy, stainless steel, titanium, and blends thereof.

15. The hose assembly of claim 14, wherein said convoluted tube is a stainless steel convoluted tube.

16. The hose assembly of claim 10, which further comprises an outer layer located on said outermost surfaces of said convoluted tube.

17. The hose assembly of claim 16, wherein said outer layer is a reinforcing layer.

18. The hose assembly of claim 17, wherein said reinforcing layer is a metal reinforcing layer.

19. The hose assembly of claim 16, wherein said outer layer is a protective jacket.

20. The hose assembly of claim 19, wherein said protective jacket is a polyvinyl chloride protective jacket or a polyethylene protective jacket.

21. The hose assembly of claim 10, which further comprises a reinforcing layer located on said outermost surfaces of said convoluted tube and a protective jacket layer located on said reinforcing layer.

22. A hose assembly, for conducting fluids therethrough, which comprises:
   a metal convoluted tube having outermost surfaces and a first end having a first convolution;
   a self-flaring fitting assembly, which comprises:
      an adaptor having a tube receiving bore, which comprises: a first section having a diameter; a second section having a reduced diameter; and an internal stop shoulder intermediate thereto which prevents said tube from passing completely through said adaptor, wherein said stop shoulder extends radially inwardly forming an acute angle with said first section of said adaptor;
      a nut having a tube receiving bore and a stop shoulder;
      adjustable interengaging means on said nut and on said first section of said adaptor for moving said nut in threaded engagement towards said adaptor; and
      a split bushing assembly having a bore and comprising: a pair of oppositely disposed, alignable, substantially arcuate and semi-circular bushing halves that, when assembled together, define a circular opening; two spaced internal ribs; an acutely angled first end; and a second end which is engageable with said stop shoulder of said nut; and
   a thermoplastic resin protective jacket located on said outermost surfaces of said convoluted tube; wherein,
   when said bushing halves of said split bushing assembly are assembled on said first end of said convoluted tube that has been inserted through said nut and from which a portion of said thermoplastic resin protective jacket has been removed, such that a first internal rib of said split bushing assembly contacts a circumferential groove on said first end of said convoluted tube, and such that a second internal rib contacts said protective jacket, and
   when said first end of said convoluted tube with said bushing halves assembled thereon is inserted into said first section of said adaptor and said nut moved in threaded engagement toward said adaptor, said first convolution of said first end of convoluted tube is compressed between said internal stop shoulder of said adaptor and said first end of said split bushing assembly in a flared configuration.

23. The hose assembly of claim 22, wherein said second internal rib is larger in inside diameter than said first internal rib of said split bushing assembly.

24. A self-flaring fitting assembly for semi-flexible, convoluted pipes or tubing, which comprises:
   an adaptor having a tube receiving bore, which comprises: a first section having a diameter; a second section having a reduced diameter; and an internal stop shoulder intermediate thereto which prevents said tube from passing completely through said adaptor, wherein said second section of said adaptor has a first end contiguous to said stop shoulder which extends radially outwardly from said second section of said adaptor forming an obtuse angle with said internal stop shoulder;
   a nut having a tube receiving bore and a stop shoulder;

adjustable interengaging means on said nut and on said first section of said adaptor for moving said nut in threaded engagement towards said adaptor; and a spilt bushing assembly having a bore and comprising: at least two alignable and substantially arcuate bushing sections that, when assembled together, define an opening; at least two spaced internal ribs; a first end; and a second end which is engageable with said stop shoulder of said nut;

wherein, when said bushing sections of said split bushing assembly are assembled on an end of a convoluted tube that has been inserted through said nut, such that said internal ribs of said split bushing assembly contact circumferential grooves on said end of said convoluted tube, and when said end of said convoluted tube with said bushing sections assembled thereon is inserted into said first section of said adaptor and said nut moved in threaded engagement toward said adaptor, a first convolution of said end of said convoluted tube is compressed between said internal stop shoulder of said adaptor and said first end of said split bushing assembly in a flared configuration.

25. An adaptor having a tube receiving bore for use in a self-flaring fitting assembly for semi-flexible, convoluted pipes or tubing, which comprises: a first section having a first segment, wherein said first segment has a smooth continuous constant inner diameter throughout its length; a second section having a reduced diameter; and a radially inward and axially extending internal stop shoulder intermediate thereto which prevents said tube from passing completely through said adaptor, wherein said stop shoulder forms an acute angle with said first segment of said first section of said adaptor, and wherein an inner surface of said second section of said adaptor has a first end which is contiguous to said stop shoulder, wherein said first end extends radially outwardly from said inner surface of said second section of said adaptor forming an obtuse angle with said internal stop shoulder.

26. An adaptor having a tube receiving bore for use in a self-flaring fitting assembly for semi-flexible, convoluted pipes or tubing, which comprises: a first section having a first segment, wherein said first segment has a smooth continuous constant inner diameter throughout its length; a second section having a reduced diameter; and a radially inward and axially extending internal stop shoulder intermediate thereto which prevents said tube from passing completely through said adaptor, wherein an inner surface of said second section of said adaptor has a first end which is continuous to said stop shoulder, wherein said first end extends radially outwardly from said inner surface of said second section of said adaptor forming an obtuse angle with said internal stop shoulder.

* * * * *

UNITED STATES PATENT AND TRADEMARK OFFICE
CERTIFICATE OF CORRECTION

PATENT NO.     : 6,173,995 B1
DATED          : January 16, 2001
INVENTOR(S)    : Andrew E. Mau It is certified that error appears in the above-identified patent and that said Letters Patent is hereby corrected as shown below:

Column 1,
Line 41, after "piping" delete ",".

Column 3,
Line 8, delete "Ward by" and after "manufactured and sold" insert -- by Ward --.

Column 5,
Line 45, after "fitting" delete ",".

Claim 1, column 6,
Line 12, delete "spilt" and before "bushing" insert -- split --;
Line 15, delete ":" and after "ing" insert -- ; --.

Claim 22, column 8,
Line 49, before "convoluted" insert -- said --.

Claim 24, column 9,
Line 4, delete "spilt" and before "bushing" insert -- split --.

Signed and Sealed this

Twenty-third Day of October, 2001

Attest:

NICHOLAS P. GODICI
Attesting Officer    Acting Director of the United States Patent and Trademark Office